United States Patent
Zhang (10) Patent No.: US 9,199,647 B2
(45) Date of Patent: Dec. 1, 2015

(54) APPARATUS AND METHOD FOR OPERATING A HYBRID DRIVE SYSTEM DURING AN EXTENDED BRAKING CONDITION

(75) Inventor: Yisheng Zhang, Dublin, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 13/339,783

(22) Filed: Dec. 29, 2011

(65) Prior Publication Data

US 2012/0173104 A1 Jul. 5, 2012

Related U.S. Application Data

(60) Provisional application No. 61/427,851, filed on Dec. 29, 2010.

(51) Int. Cl.
| | |
|---|---|
| G06F 7/70 | (2006.01) |
| G06F 19/00 | (2011.01) |
| G06G 7/00 | (2006.01) |
| G06G 7/76 | (2006.01) |
| B60W 30/18 | (2012.01) |
| B60K 6/12 | (2006.01) |

(Continued)

(52) U.S. Cl.
CPC ............ *B60W 30/18127* (2013.01); *B60K 6/12* (2013.01); *B60W 10/02* (2013.01); *B60W 10/04* (2013.01); *B60W 2510/09* (2013.01); *B60W 2540/12* (2013.01); *Y02T 10/6208* (2013.01); *Y02T 10/6282* (2013.01); *Y02T 10/92* (2013.01)

(58) Field of Classification Search
CPC ........ B60K 6/12; B60W 10/02; B60W 10/04; B60W 30/18127; B60W 2510/09; B60W 2540/12; Y02T 10/6208

USPC .................... 701/70, 22, 36; 180/65.2, 65.21
See application file for complete search history.

(56) References Cited

U.S. PATENT DOCUMENTS

| | | | |
|---|---|---|---|
| 4,441,573 A | 4/1984 | Carman et al. | |
| 5,088,041 A * | 2/1992 | Tanaka et al. | 701/70 |
| 6,170,587 B1 | 1/2001 | Bullock | |

(Continued)

FOREIGN PATENT DOCUMENTS

| | | |
|---|---|---|
| WO | 2008153670 A2 | 12/2008 |
| WO | 2009007879 A2 | 1/2009 |

(Continued)

*Primary Examiner* — Jason Holloway
*Assistant Examiner* — Rachid Bendidi
(74) *Attorney, Agent, or Firm* — MacMillan, Sobanski & Todd, LLC (57) ABSTRACT

A hybrid drive system for use in a drive train assembly of a vehicle includes a control apparatus that operates the hybrid drive system in either a normal energy recovery mode in response to a braking request or an extended braking mode in response to an extended braking request. In the normal energy recovery mode, fluid is pumped to an accumulator, which consumes kinetic energy of the vehicle and causes deceleration of the vehicle. In the extended braking mode, fluid is pumped through a pressure relief valve containing a restriction, which consumes the kinetic energy of the vehicle and causes deceleration of the vehicle. If the temperature of the fluid being pumped through the pressure relief valve exceeds a predetermined value, fluid is alternatively pumped through a pump/motor operating in a motoring mode, which consumes the kinetic energy of the vehicle and causes deceleration the vehicle.

11 Claims, 3 Drawing Sheets

(51) Int. Cl.
   *B60W 10/02* (2006.01)
   *B60W 10/04* (2006.01)

(56) References Cited

U.S. PATENT DOCUMENTS

| | | | |
|---|---|---|---|
| 6,945,893 B2 | 9/2005 | Grillo et al. | |
| 6,966,394 B2* | 11/2005 | Fleming | 180/165 |
| 7,147,078 B2 | 12/2006 | Teslak et al. | |
| 7,201,095 B2 | 4/2007 | Hughey | |
| 7,392,871 B2* | 7/2008 | Severinsky et al. | 180/65.28 |
| 7,395,887 B2 | 7/2008 | Viergever et al. | |
| 7,537,075 B2 | 5/2009 | Gray, Jr. et al. | |
| 7,597,172 B1* | 10/2009 | Kovach et al. | 180/305 |
| 7,669,414 B2* | 3/2010 | Loeffler | 60/414 |
| 7,779,628 B2* | 8/2010 | Petre | 60/413 |
| 7,793,496 B2 | 9/2010 | Rampen et al. | |
| 7,806,796 B2 | 10/2010 | Zhu | |
| 7,828,395 B2 | 11/2010 | Cannata | |
| 2005/0269875 A1 | 12/2005 | Maki et al. | |
| 2006/0000208 A1* | 1/2006 | Teslak et al. | 60/414 |
| 2006/0021456 A1* | 2/2006 | Hughes | 74/340 |
| 2006/0108860 A1* | 5/2006 | Stragier | 303/15 |
| 2006/0116797 A1 | 6/2006 | Moran | |
| 2006/0137927 A1* | 6/2006 | Fleming | 180/165 |
| 2007/0182245 A1* | 8/2007 | DuCharme | 303/152 |
| 2008/0174174 A1* | 7/2008 | Burns et al. | 303/152 |
| 2008/0211230 A1 | 9/2008 | Gurin | |
| 2008/0300762 A1* | 12/2008 | Crombez | 701/70 |
| 2009/0032317 A1 | 2/2009 | Epshteyn | |
| 2009/0062060 A1* | 3/2009 | Rink | 477/4 |
| 2009/0076690 A1 | 3/2009 | Guo et al. | |
| 2009/0095549 A1 | 4/2009 | Dalum et al. | |
| 2009/0124456 A1 | 5/2009 | Zhang et al. | |
| 2009/0127011 A1* | 5/2009 | Zhang | 180/65.28 |
| 2009/0173066 A1* | 7/2009 | Duray | 60/413 |
| 2009/0177345 A1* | 7/2009 | Severinsky et al. | 701/22 |
| 2009/0270221 A1* | 10/2009 | Kovach et al. | 477/3 |
| 2010/0133031 A1* | 6/2010 | Mendler | 180/165 |
| 2010/0141024 A1* | 6/2010 | Fouquet et al. | 303/15 |
| 2010/0175579 A1 | 7/2010 | Read | |
| 2010/0186408 A1* | 7/2010 | Rose et al. | 60/629 |
| 2010/0192563 A1* | 8/2010 | Rose et al. | 60/415 |
| 2010/0307156 A1 | 12/2010 | Bollinger et al. | |
| 2011/0208381 A1* | 8/2011 | Le Brusq et al. | 701/22 |
| 2012/0077632 A1* | 3/2012 | Babbitt et al. | 475/1 |

FOREIGN PATENT DOCUMENTS

| | | |
|---|---|---|
| WO | 2010066024 A1 | 6/2010 |
| WO | 2010144753 A1 | 12/2010 |

\* cited by examiner

APPARATUS AND METHOD FOR OPERATING A HYBRID DRIVE SYSTEM DURING AN EXTENDED BRAKING CONDITION

CROSS-REFERENCE TO RELATED APPLICATIONS

This application claims the benefit of U.S. Provisional Application No. 61/427,851, filed Dec. 29, 2010, the disclosure of which is incorporated herein by reference. The subject matter of this application is related to the subject matter disclosed in commonly owned and co-pending U.S. patent application Ser. No. 12/275,376 filed Nov. 21, 2008, the disclosure of which is also incorporated herein by reference.

BACKGROUND OF THE INVENTION

This invention relates in general to hybrid drive systems, such as are used in conjunction with drive train assemblies for vehicles. In particular, this invention relates to an improved apparatus and method for operating a hybrid drive system in such a manner as to reduce the speed of the vehicle during an extended braking condition, such as might occur when a vehicle is driven down a lengthy hill.

Drive train assemblies are widely used for generating power from a source and for transferring such power from the source to a driven mechanism. Frequently, the source generates rotational power, and such rotational power is transferred from the source of rotational power to a rotatably driven mechanism. For example, in most land vehicles in use today, an engine generates rotational power, and such rotational power is transferred from an output shaft of the engine through a driveshaft to an input shaft of an axle assembly so as to rotatably drive the wheels of the vehicle.

In some of these land vehicles and other mechanisms, a hybrid drive system (also known as an energy recovery system) is provided in conjunction with the drive train assembly to selectively decelerate the rotatably driven mechanism, accumulate energy resulting from such deceleration, and use the accumulated energy to subsequently re-accelerate the rotatably driven mechanism. To accomplish this, a typical hybrid drive system includes a reversible energy transfer machine that is coupled to the drive train assembly and an energy storage device that communicates with the reversible energy transfer machine. To decelerate the vehicle, the hybrid drive system functions in an energy recovery mode, wherein the reversible energy transfer machine slows the rotation of the rotatably driven mechanism and stores the kinetic energy of the vehicle in the energy storage device as potential energy. To subsequently re-accelerate the vehicle, the hybrid drive system functions in a driving mode, wherein the potential energy stored in the energy storage device is supplied to the reversible energy transfer machine to rotatably drive the rotatably driven mechanism.

Virtually all land vehicles are provided with conventional foundation brakes that can be manually operated by a driver to reduce the speed of the vehicle. On those vehicles that are additionally provided with a hybrid drive system, the use of such foundation brakes can be significantly reduced because the hybrid drive system can decelerate the vehicle during the energy recovery mode described above. However, the ability of the hybrid drive system to recover and store energy in this manner is limited. Thus, when braking occurs for an extended period of time (such as when the vehicle is descending a lengthy hill), it is undesirable for a conventional hybrid drive system to be operated in the normal energy recovery mode to decelerate the vehicle. Consequently, the foundation brakes of the vehicle must be applied for an extended period of time, which can generate undesirable heat. Accordingly, it would be desirable to provide an improved apparatus and method for operating a hybrid drive system in such a manner as to reduce the speed of the vehicle during an extended braking condition.

SUMMARY OF THE INVENTION

This invention relates to an improved apparatus and method for operating a hybrid drive system in such a manner as to reduce the speed of the vehicle during an extended braking condition, such as might occur when a vehicle is driven down a lengthy hill. The hybrid drive system includes a control apparatus that operates the hybrid drive system in either a normal energy recovery mode in response to a braking request or an extended braking mode in response to an extended braking request. In the normal energy recovery mode, fluid is pumped to an accumulator, which consumes kinetic energy of the vehicle and causes deceleration of the vehicle. In the extended braking mode, fluid is pumped through a pressure relief valve containing a restriction, which consumes the kinetic energy of the vehicle and causes deceleration of the vehicle. If the temperature of the fluid being pumped through the pressure relief valve exceeds a predetermined value, fluid is alternatively pumped through a pump/motor operating in a motoring mode, which consumes the kinetic energy of the vehicle and causes deceleration the vehicle.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
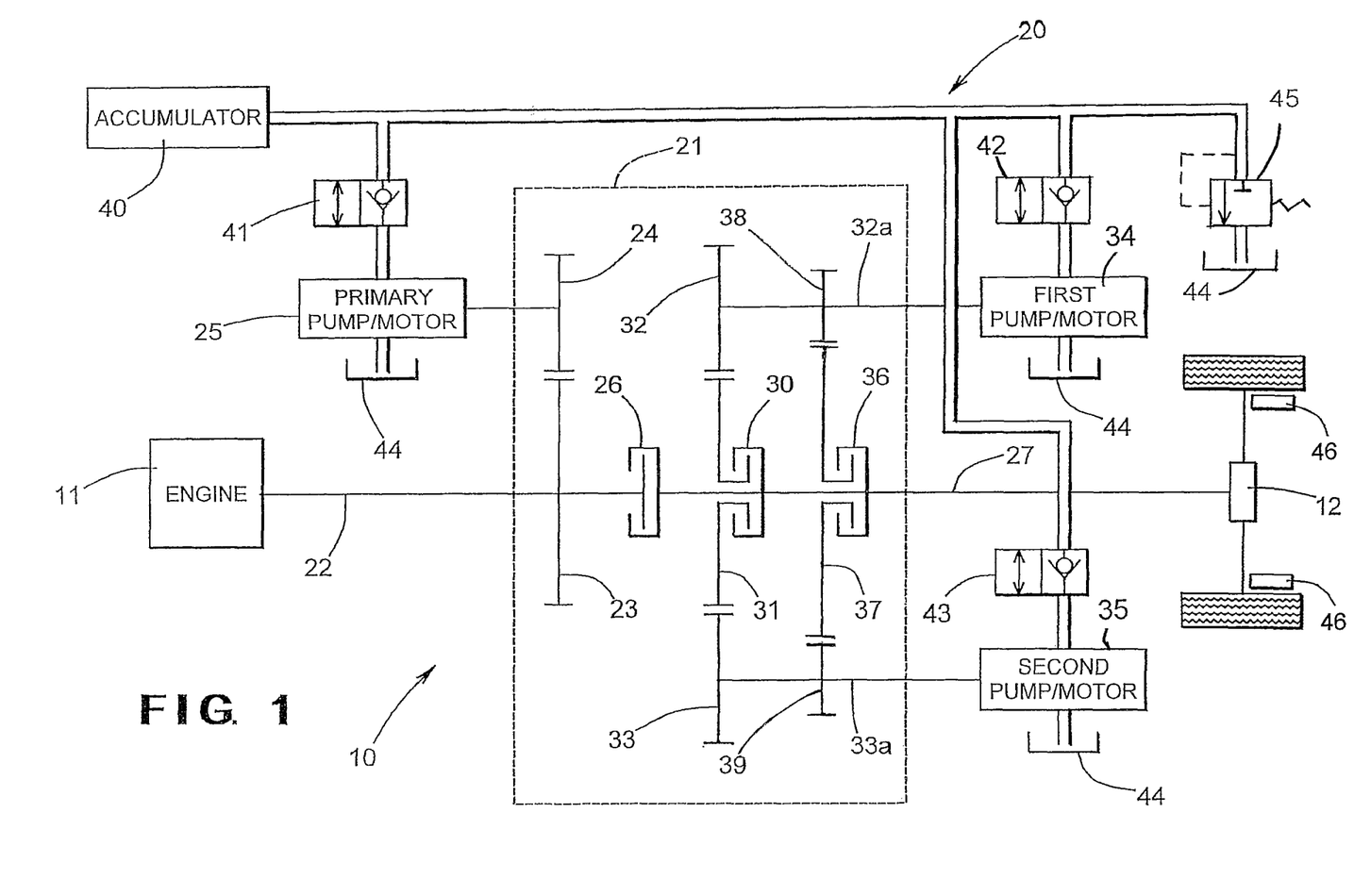
FIG. 1 is a schematic diagram of a drive train assembly including a hybrid drive system in accordance with this invention.

Referring now to the drawings, there is illustrated in FIG. 1 a drive train assembly, indicated generally at 10, for generating power from a source and for transferring such power from the source to a driven mechanism. The illustrated drive train assembly 10 is a vehicular drive train assembly that includes an engine 11 that generates rotational power to an axle assembly 12 by means of a hybrid drive system, indicated generally at 20. However, the illustrated vehicle drive train assembly 10 is intended merely to illustrate one environment in which this invention may be used. Thus, the scope of this invention is not intended to be limited for use with the specific structure for the vehicular drive train assembly 10 illustrated in FIG. 1 or with vehicle drive train assemblies in general. On the contrary, as will become apparent below, this invention may be used in any desired environment for the purposes described below.

The illustrated hybrid drive system 20 includes a power drive unit 21 that is connected between the engine 11 and the axle assembly 12. The illustrated power drive unit 21 is, in large measure, conventional in the art and is intended merely to illustrate one environment in which this invention may be used. Thus, the scope of this invention is not intended to be limited for use with the specific structure for the power drive unit 21 illustrated in FIG. 1. The illustrated power drive unit 21 includes an input shaft 22 that is rotatably driven by the engine 11. An input gear 23 is supported on the input shaft 22 for rotation therewith. The input gear 23 is connected for rotation with a primary pump drive gear 24 that, in turn, is connected for rotation with an input shaft of a primary pump/motor 25. Thus, the primary pump/motor 25 is rotatably driven whenever the engine 11 is operated. The purpose of the primary pump/motor 25 will be explained below.

The illustrated power drive unit 21 also includes a main drive clutch 26 that selectively connects the input shaft 22 to an output shaft 27. When the main drive clutch 26 is engaged, the input shaft 22 is connected for rotation with the output shaft 27. When the main drive clutch 26 is disengaged, the input shaft 22 is not connected for rotation with the output shaft 27. The output shaft 27 is connected for rotation with an input shaft of the axle assembly 12. Thus, the axle assembly 12 is rotatably driven by the engine 11 in a direct drive gear ratio whenever the main drive clutch 26 is engaged.

The illustrated power drive unit 21 further includes a low drive clutch 30 that selectively connects the output shaft 27 to a low drive clutch gear 31. The low drive clutch output gear 31 is connected for rotation with both a first low drive output gear 32 and a second low drive output gear 33. The first low drive output gear 32 is connected for rotation with a first shaft 32a that, in turn, is connected for rotation with an input shaft of a first pump/motor 34. Similarly, the second low drive output gear 33 is connected for rotation with a second shaft 33a that, in turn, is connected for rotation with an input shaft of a second pump/motor 35. Thus, when both the main drive clutch 26 and the low drive clutch 30 are engaged, the output shaft 27 rotatably drives both the first pump/motor 34 and the second pump/motor 35. The purpose for both the first pump/motor 34 and the second pump/motor 35 will be explained below.

Similarly, the illustrated power drive unit 21 further includes a high drive clutch 36 that selectively connects the output shaft 27 to a high drive clutch gear 37. The high drive clutch output gear 37 is connected for rotation with both a first high drive output gear 38 and a second high drive output gear 39. The first high drive output gear 38 is connected for rotation with the first shaft 32a that, as mentioned above, is connected for rotation with the input shaft of the first pump/motor 34. Similarly, the second high drive output gear 39 is connected for rotation with the second shaft 33a that, as also mentioned above, is connected for rotation with the input shaft of the second pump/motor 35. Thus, when both the main drive clutch 26 and the high drive clutch 36 are engaged, the output shaft 27 rotatably drives both the first pump/motor 34 and the second pump/motor 35. The low drive gears 31, 32, and 33 are selected to provide a relatively low gear ratio when the main drive clutch 26 and the low drive clutch 30 are engaged, in comparison with the relatively high gear ratio provided by the high drive gears 37, 38, and 39 when the main drive clutch 26 and the high drive clutch 36 are engaged.

The illustrated power drive unit 21 also includes an accumulator 40 or similar relatively high fluid pressure storage device. The accumulator 40 selectively communicates with a first port of the primary pump/motor 25 through a primary pump valve 41. The primary pump valve 41 is conventional in the art and can be operated in a first position (shown in FIG. 1), wherein fluid communication from the accumulator 40 to the first port of the primary pump/motor 25 is prevented and fluid communication from the first port of the primary pump/motor 25 to the accumulator 40 is permitted. However, the primary pump valve 41 can be operated in a second position (to the right when viewing FIG. 1), wherein fluid communication from the accumulator 40 to the first port of the primary pump/motor 25 is permitted and fluid communication from the first port of the primary pump/motor 25 to the accumulator 40 is permitted.

The accumulator 40 also selectively communicates with a first port of the first pump/motor 34 through a first control valve 42. The first control valve 42 is conventional in the art and can be operated in a first position (shown in FIG. 1), wherein fluid communication from the accumulator 40 to the first port of the first pump/motor 34 is prevented and fluid communication from the first port of the first pump/motor 34 to the accumulator 40 is permitted. However, the first control valve 42 can be operated in a second position (to the right when viewing FIG. 1), wherein fluid communication from the accumulator 40 to the first port of the first pump/motor 34 is permitted and fluid communication from the first port of the first pump/motor 34 to the accumulator 40 is permitted.

The accumulator 40 further selectively communicates with a first port of the second pump/motor 35 through a second control valve 43. The second control valve 43 is conventional in the art and can be operated in a first position (shown in FIG. 1), wherein fluid communication from the accumulator 40 to the first port of the second pump/motor 35 is prevented and fluid communication from the first port of the second pump/motor 35 to the accumulator 40 is permitted. However, the second control valve 43 can be operated in a second position (to the right when viewing FIG. 1), wherein fluid communication from the accumulator 40 to the first port of the second pump/motor 35 is permitted and fluid communication from the first port of the second pump/motor 35 to the accumulator 40 is permitted.

The illustrated power drive unit 21 further includes a reservoir 44 or similar relatively low fluid pressure storage device. Each of the primary pump/motor 25, the first pump/motor 34, and the second pump/motor 35 includes a second port, and all of such second ports communicate with the reservoir 44 to draw hydraulic fluid therefrom when necessary, as described below.

A pressure relief valve 45 is provided in a line that communicates with each of the accumulator 40, the primary pump valve 41, the first control valve 42, and the second control valve 43 on the one hand and the reservoir 44 on the other hand. The pressure relief valve 45 is conventional in the art and is normally maintained in a first position (shown in FIG. 1), wherein fluid communication between the line and the reservoir 44 is prevented. However, the pressure relief valve 45 can be operated in a second position (to the right when viewing FIG. 1), wherein fluid communication between the line and the reservoir 44 is permitted. As will be explained in greater detail below, when the magnitude of the fluid pressure in the line connected to the accumulator 40, the primary pump valve 41, the first control valve 42, and the second control valve 43 exceeds a predetermined value, the pressure relief valve 45 will be moved from its first position to its second position. The purpose of the pressure relief valve 45 will be explained in detail below.

The drive train assembly 10 further includes a foundation brake system to affirmatively slow or stop the rotation of the axle assembly 12. As shown in FIG. 1, the illustrated foundation brake system is provided in conjunction with the axle assembly 12 of the illustrated drive train assembly 10 as a pair of friction brakes 46 associated with respective wheels of the vehicle. The friction brakes 46 are conventional in the art and may be actuated in any desired manner, such as pneumatically or hydraulically.

Figure 2:
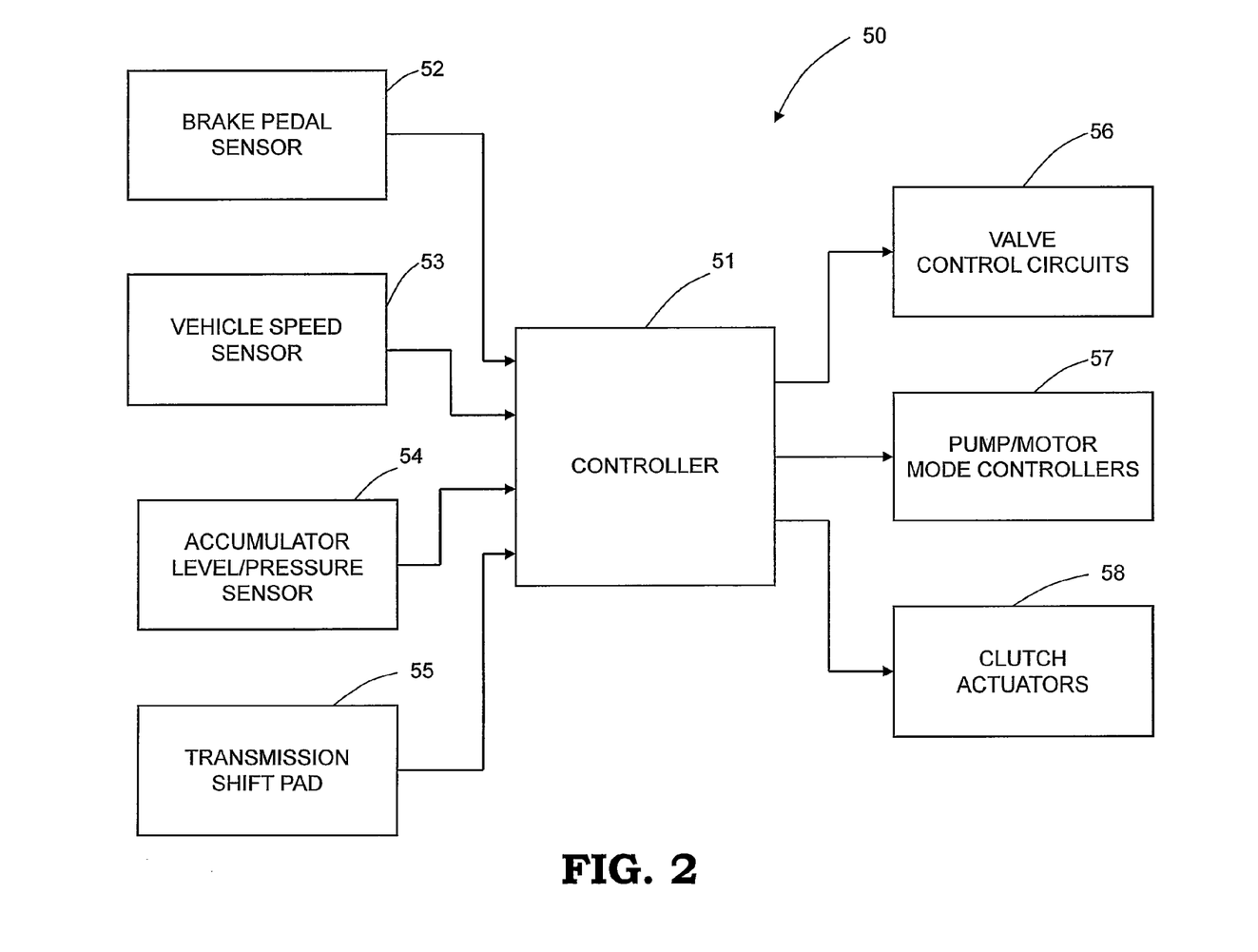
FIG. 2 is a block diagram of a portion of a control apparatus for operating the hybrid drive system illustrated in FIG. 1.

FIG. 2 is a block diagram of a portion of a control apparatus, indicated generally at 50, for operating the hybrid drive system 20 illustrated in FIG. 1. The illustrated control apparatus 50 includes a controller 51, which may be embodied as a conventional microprocessor or any other programmable control device. Generally speaking, the controller 51 is adapted to sense one or more operating conditions of the vehicle and to use those operating conditions to selectively operate the hybrid drive system 20 either in a normal energy recovery mode or in an extended braking mode, both of which will be described in detail below.

In the illustrated embodiment, the controller 51 receives a braking request signal from a brake pedal sensor 52 or other conventional device that is representative of a request from the driver to decelerate the vehicle. The braking request signal may indicate not only that the driver of the vehicle wants to decelerate the vehicle, but how quickly such deceleration is desired. For example, the braking request signal generated by the brake pedal sensor 52 may be representative of the amount of force that is exerted by a foot of the driver on a brake pedal of the vehicle. The illustrated controller 51 also receives an actual speed signal from an actual speed sensor 53 or other conventional device that is representative of the actual speed of the vehicle. The illustrated controller 51 also receives an accumulator condition signal from an accumulator sensor 54 or other conventional device that is representative of a characteristic of the accumulator 40. For example, the accumulator sensor 54 may generate an accumulator condition that is representative of either of the pressure or the quantity (or both) of the hydraulic fluid contained in the accumulator 40. Lastly, the illustrated controller 51 receives a transmission shift signal from a transmission shift pad 55 or other conventional device that is representative of a desired gear ratio to be implemented by the power drive unit 21 (such as the direct drive, the relatively low, and the relatively high gear ratios described above) or other characteristic of the hybrid drive system 20. Alternatively, any desired input or series of inputs from the transmission shift pad 55 may be sent to the controller 51 as the transmission shift signal. If desired, the controller 51 may receive one or more additional input signals (not shown) representing any other portion or portions of the hybrid drive system 20 or the vehicle.

In response to the various input signals that it receives, the illustrated controller 51 generates output signals to control the operation of the various components of the hybrid drive system 20. For example, the illustrated controller 51 generates a valve control signal to one or more valve control circuits 56. Each of the valve control circuits 56 is conventional in the art and is adapted to control the operation of an associated one of the primary pump valve 41, the first control valve 42, and the second control valve 43. The illustrated controller 51 also generates a pump/motor control signal to one or more pump/motor control circuits 57. Each of the pump/motor control circuits 57 is conventional in the art and is adapted to control the operation of an associated one of the primary pump/motor 25, the first pump/motor 34, and the second pump/motor 35. Lastly, the illustrated controller 51 generates a clutch actuator signal to one or more clutch actuators 58. Each of the clutch actuators 58 is conventional in the art and is adapted to control the operation of an associated one of the main drive clutch 26, the low drive clutch 30, and the high drive clutch 36.

The basic operation of the drive train assembly 10 in the normal energy recovery mode will now be described. When the engine 11 of the drive train assembly 10 is initially started, the main drive clutch 26, the low drive clutch 30, and the high drive clutch 36 are all disengaged, and the primary pump valve 41, the first control valve 42, and the second control valve 43 are all in their first positions illustrated in FIG. 1. In this initial condition, the engine 11 rotatably drives the primary pump/motor 25 through the input shaft, the input gear 23, and the primary pump drive gear 24, as described above. As a result, the primary pump/motor 25 draws fluid from the reservoir 44 through the second port thereof, and further supplies such fluid under pressure from the first port of the primary pump/motor 25 through the primary pump valve 41 to the accumulator 40. As discussed above, in their first positions, the first and second control valves 42 and 43 prevent the pressurized fluid from the primary pump/motor 25 or the accumulator 40 from being supplied to either of the first ports of the first and second pump/motors 34 and 35, respectively. Such initial operation continues until a sufficient amount of such pressurized fluid has been supplied to the accumulator 40, at which time the engine 11 can be turned off. Because the main drive clutch 26, the low drive clutch 30, and the high drive clutch 36 are all disengaged, the engine 11 does not rotatably drive the output shaft 27 or the axle assembly 12 during this initial operation of the drive train assembly 10.

When it is desired to move the vehicle, the low drive clutch 30 is engaged, while the main drive clutch 26 and the high drive clutch 36 remain disengaged. As a result, the output shaft 27 is connected to the low drive clutch gear 31 for concurrent rotation. At the same time, the first control valve 42 and the second control valve 43 are each moved to their second positions. This permits pressurized fluid from the accumulator 40 to flow to the first ports of both the first pump/motor 34 and the second pump/motor 35. Lastly, the first and second pump/motors 34 and 35 are each placed in a mode wherein they function as motors to use the pressurized fluid supplied by the accumulator 40 to rotatably drive the first and second shafts 32a and 33a. In turn, this causes the low drive gears 31, 32, and 33 and the output shaft 27 to be rotatably driven. As a result, the axle assembly 12 is rotatably driven at the relatively low gear ratio provided by the low drive gears 31, 32, and 33. Such a relatively low gear ratio is well suited for providing the relatively high torque needed to accelerate the vehicle from a standstill.

Once it has begun to move, it may be desirable to move the vehicle at a higher speed than is suitable for the relatively low gear ratio provided by the low drive gears 31, 32, and 33. In this instance, the power drive unit 21 can be operated to disengage the low drive clutch 30 and engage the high drive clutch 36, while maintaining the main drive clutch 26 disengaged. As a result, the output shaft 27 is connected to the high drive clutch output gear 37 for concurrent rotation. The first control valve 42 and the second control valve 43 are each moved to (or maintained in) their second positions. As described above, this permits pressurized fluid from the accumulator 40 to flow to the first ports of both the first pump/motor 34 and the second pump/motor 35. As also described above, the first and second pump/motors 34 and 35 are each placed (or maintained in) in the mode wherein they function as motors to use the pressurized fluid supplied by the accumulator 40 to rotatably drive the first and second shafts 32a and 33a. In turn, this causes the high drive gears 37, 38, and 39 and the output shaft 27 to be rotatably driven. As a result, the axle assembly 12 is rotatably driven at the relatively high gear ratio provided by the high drive gears 37, 38, and 39. Such a relatively high gear ratio is well suited for providing the relatively low torque needed to operate the vehicle at a relatively high speed.

If it is desired to operate the vehicle at a further higher speed, the power drive unit 21 can be operated to disengage the high drive clutch 36 and engage the main drive clutch 26, while the low drive clutch 30 remains disengaged. As a result, the output shaft 27 is directly connected to the input shaft 22 for concurrent rotation. At the same time, the first control valve 42 and the second control valve 43 are each moved to their first positions. As described above, this prevents pressurized fluid from the accumulator 40 from flowing to the outputs of both the first pump/motor 34 and the second pump/motor 35. As a result, the first and second pump/motors 34 and 35 are isolated from the drive train assembly 10.

When a braking request is generated by a driver of the vehicle, the above-described components of the hybrid drive system 20 can also be used to slow or stop the movement of the vehicle. Such a braking request can be determined in any conventional manner, such as when a braking request signal is sent from the brake pedal sensor 52 to the controller 51. To slow the speed of the vehicle, the controller 51 causes the main drive clutch 26 and the low drive clutch 30 to be disengaged and the high drive clutch 36 to be engaged (in some instances, it may be preferable that the main drive clutch 26 and the high drive clutch 36 be disengaged, while the low drive clutch 30 is engaged). Regardless, however, the controller 51 also causes the first control valve 42 and the second control valve 43 to be each moved to (or maintained in) their first positions. Lastly, the controller 51 causes the first and second pump/motors 34 and 35 to be placed in a mode wherein they function as pumps to use the rotational energy of the rotating output shaft 27 to supply pressurized fluid to the accumulator 40. As a result, the output shaft 27 rotates the high drive gears 37, 38, and 39 (or the low drive gears 31, 32, and 33), which causes the first pump/motor 34 and the second pump/motor 35 to be rotatably driven. Consequently, the rotation of the axle assembly 12 is decelerated as the kinetic energy thereof is stored as fluid pressure in the accumulator 40.

The ability of the hybrid drive system to recover and store energy in the manner described above is limited. For example, when braking is performed for an extended period of time (such as when the vehicle is descending a lengthy hill), it may be undesirable for the hybrid drive system 20 to be operated in the manner described above to decelerate the vehicle. Primarily, this is because the accumulator 40 can only store a limited amount (pressure, quantity, or both) of the hydraulic fluid therein. Also, as mentioned above, it is undesirable for the foundation brakes of the vehicle to be applied for an extended period of time because they will generate undesirable heat. Rather, it is desirable that the hybrid drive system 20 be operated in an extended braking mode in accordance with this invention.

Figure 3:
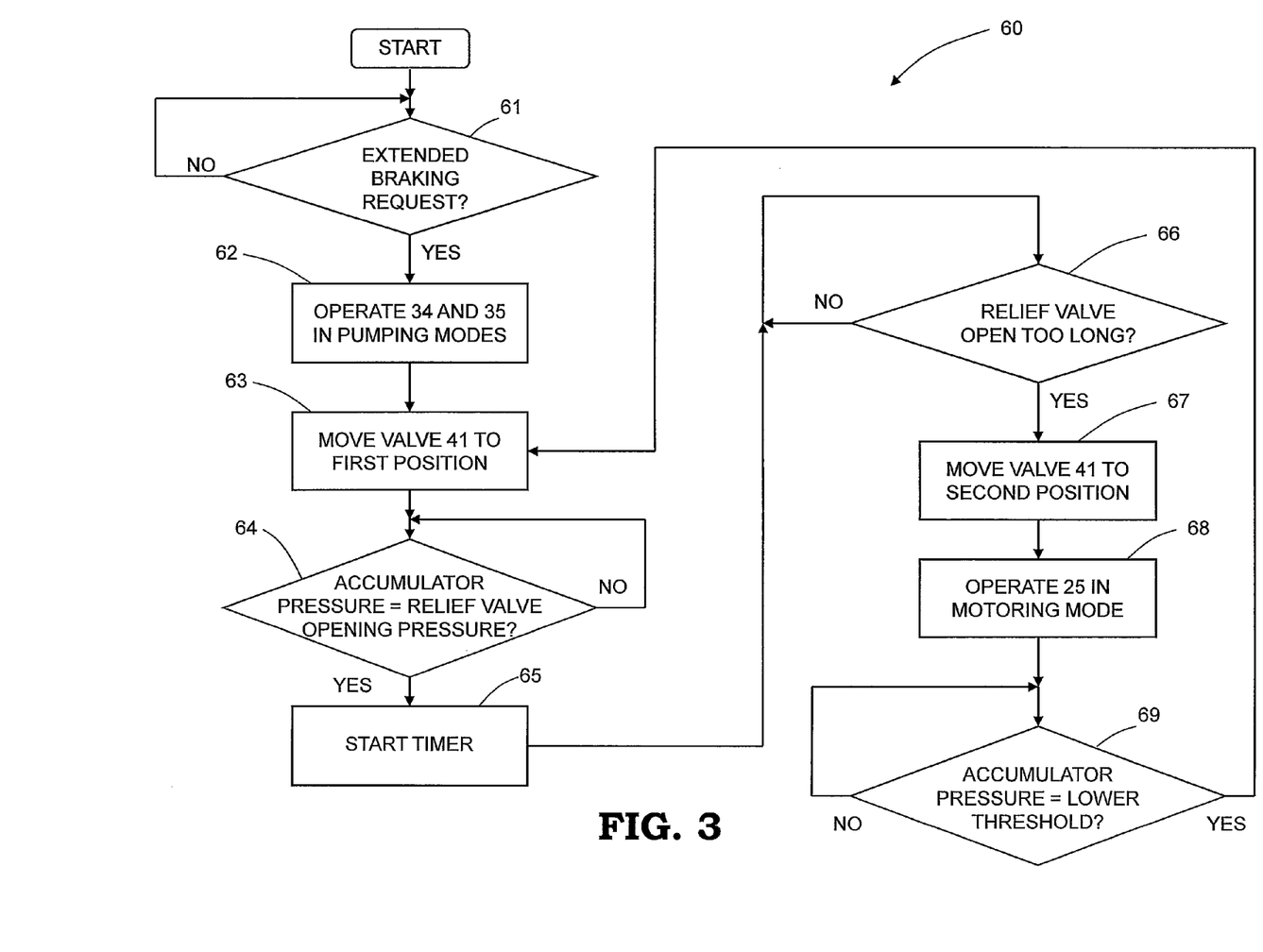
FIG. 3 is a flowchart of a method for operating the control apparatus illustrated in FIG. 2 in accordance with this invention.

Referring now to FIG. 3, there is illustrated a flowchart of a method, indicated generally at 60, for operating the control apparatus 50 illustrated in FIG. 2 in the extended braking mode. In an initial decision point 61 of the method 60, it is determined whether an extended braking request has been made. As discussed above, the controller 51 is responsive to one or more operating conditions of the vehicle to selectively operate the hybrid drive system 20 either in the normal energy recovery mode as described above or in the extended braking mode. Those operating conditions of the vehicle can include, for example, any or all of the signals generated from the brake pedal sensor 52, the vehicle speed sensor 53, the accumulator sensor 54, and the transmission shift pad 55 to the controller 51. The controller 51 can be programmed to interpret any or all of such signals (or any other input signal, for that matter) as an indication that it is desired to operate the hybrid drive system in the extended braking mode. For example, the controller 51 can be programmed to interpret that the application of foot pressure to the brake pedal for longer than a predetermined period of time as an indication that operation of the hybrid drive system in the extended braking mode is desired. Alternatively, the controller 51 can be responsive to a signal from the accumulator sensor 54 indicating that the pressure of the fluid within the accumulator 40 has reached a predetermined threshold as an indication that operation of the hybrid drive system in the extended braking mode is desired. Still further, the controller 51 can be programmed to interpret a specific input or series of inputs from the transmission shift pad 55 as an indication that operation of the hybrid drive system in the extended braking mode is desired.

Regardless of how the determination is made, the method 60 of this invention remains in this initial decision point 61 until the control apparatus 50 determines that an extended braking request has been made. When this determination has been made, the method 60 branches from the initial decision point 61 to an instruction 62, wherein the control apparatus 50 generates one or more pump/motor control signals to the pump/motor control circuits 57. As a result, the first and second pump/motors 34 and 35 are caused to operate in a mode wherein they function as pumps to use the rotational energy of the rotating output shaft 27 to generate a flow of pressurized fluid therefrom. The method 60 then enters another instruction 63, wherein the control apparatus 50 generates one or more valve control signals to the valve control circuits 57. As a result, the primary pump valve 41 is moved to (or maintained in) its first position (shown in FIG. 1).

The method 60 next enters into a decision point 64, wherein it is determined if the pressure of the fluid contained within the accumulator 40 (or in the line between the accumulator 40 and the pressure relief valve 45) is greater than or equal to a threshold amount of pressure that is required to move the pressure relief valve 45 from its first position (shown in FIG. 1) to its second position (to the right when viewing FIG. 1). The method 60 of this invention remains in this decision point 64 until the control apparatus 50 determines that the pressure of the fluid contained within the accumulator 40 is greater than or equal to the relief valve opening pressure. When this occurs, the method 60 branches to an instruction 65, wherein a timer is started to measure the amount of time that the pressure relief valve 45 is maintained in its second position. The purpose for this timing step will be explained below.

The method 60 next enters into a decision point 66, wherein it is determined if the pressure relief valve 45 has been opened for too long of a period of time in which to safely operate the hybrid drive system 20. The method 60 of this invention remains in this decision point 64 until the control apparatus 50 determines that the pressure relief valve 45 has been opened for too long of a period of time. When this occurs, the method 60 branches to an instruction 67, wherein the control apparatus 50 generates one or more valve control signals to the valve control circuits 57. As a result, the primary pump valve 41 is caused to move to its second position (toward the right when viewing FIG. 1). The method 60 then enters another instruction 68, wherein the control apparatus 50 generates one or more pump/motor control signals to the pump/motor control circuits 57. As a result, the primary pump/motor 25 is caused to operate in a mode wherein it functions as a motor to use the flow of pressurized fluid therethrough to rotate the primary pump drive gear 24.

Lastly, the method 60 then enters a decision point 69, wherein it is determined if the pressure of the fluid contained within the accumulator 40 is less than or equal to a lower threshold amount that is somewhat less than the relief valve opening pressure. The method 60 of this invention remains in this decision point 69 until the control apparatus 50 determines that the pressure of the fluid contained within the accumulator 40 is less than or equal to the lower threshold amount. When this occurs, the method 60 branches back to the instruction 63, wherein the control apparatus 50 generates one or more valve control signals to the valve control circuits 57, which causes the primary pump valve 41 to return to its first position (shown in FIG. 1).

The basic operation of the drive train assembly 10 in the extended braking mode will now be described. When the initial determination has been made in the decision point 61 that an extended braking request has been made by the operator of the vehicle, the method 60 of this invention causes the extended braking mode to be implemented by the control apparatus 50. To accomplish this, the controller 51 initially causes the first and second pump/motors 34 and 35 to be operated in a mode wherein they function as pumps to use the rotational energy of the rotating output shaft 27 to generate a flow of pressurized fluid therefrom. Also, the controller 51 causes the primary pump valve 41 to be moved to (or maintained in) its first position (shown in FIG. 1). Lastly, the controller 51 generates one or more clutch actuator signals to one or more of the clutch actuator circuits 57, causing the main drive clutch 26 to be disengaged, the low drive clutch 30 to be disengaged, and the high drive clutch 36 to be engaged (or alternatively, as described above, causing the main drive clutch 26 to be disengaged, the low drive clutch 30 to be engaged, and the high drive clutch 36 to be disengaged).

Thereafter, in a manner that is similar to that described above in connection with braking during the normal energy recovery mode, the output shaft 27 rotates the high drive gears 37, 38, and 39 (or the low drive gears 31, 32, and 33), which causes the first pump/motor 34 and the second pump/motor 35 to be rotatably driven. As a result, fluid is pumped from the first and second pump/motors 34 and 35 into the accumulator 40. Consequently, the rotation of the axle assembly 12 is decelerated as the kinetic energy thereof is stored as fluid pressure in the accumulator 40.

However, as discussed above, the ability of the hybrid drive system 20 to recover and store energy in this manner is limited. When the capacity of the accumulator 40 has been reached, the pressure of the fluid provided from the first and second pump/motors 34 and 35 through the line to the accumulator 40 increases rapidly. When this occurs, the pressure relief valve 45 is automatically moved from its first position (shown in FIG. 1) to its second position (to the right when viewing FIG. 1). As a result, the fluid that is pumped from the first and second pump/motors 34 and 35 is passed through the pressure relief valve 45 to the reservoir 44. The pressure relief valve 45 contains an orifice (not shown) or other structure that restricts the free flow of the fluid therethrough from the first and second pump/motors 34 and 35 to the reservoir 44. Thus, the kinetic energy of the moving vehicle is used to operate the first and second pump/motors 34 and 35 to pump fluid through the restriction within the pressure relief valve 45 to the reservoir 44. As a result, the speed of the vehicle is reduced. However, unlike when the hydraulic drive system 20 is used to decelerate the vehicle in the normal braking mode as described above, the kinetic energy of the moving vehicle is not stored for future use. Rather, such kinetic energy is simply consumed to operate the first and second pump/motors 34 and 35 to pump the fluid through the pressure relief valve 45.

As this is occurring, however, some of the kinetic energy of the moving vehicle is also dissipated as heat, which is transferred to the fluid being pumped through the orifice of the pressure relief valve 45. The hydraulic drive system 20 can be operated in this manner until the temperature of the fluid being pumped through the orifice of the pressure relief valve 45 exceeds a predetermined value. At that point, the elevated temperature of the fluid being pumped through the orifice of the pressure relief valve 45 may cause damage. For example, the temperature of the fluid may increase to a point where such fluid may break down and, consequently, cease to function properly. Alternatively, the elevated temperature of the fluid may cause damage to one or more components of the hybrid drive system 20.

To address this, the method 60 of this invention determines whether the temperature of the fluid being pumped through the orifice of the pressure relief valve 45 exceeds a predetermined threshold. Such a determination can be made in any desired manner, such as by a direct temperature measurement of the temperature of the fluid can be made, for example. In the illustrated embodiment, however, the temperature of the fluid is calculated as a function of the amount of time that it is being pumped through the orifice of the pressure relief valve 45, as shown in steps 65 and 66 of the above-described method 60. In other words, after fluid is pumped through the orifice of the pressure relief valve 45 for a predetermined period of time, it can be assumed that the temperature of such fluid is approaching a magnitude where it would be desirable to cease operating the hybrid drive system 20 in this manner. Such a time-calculated temperature determination is reliable and relatively easy to implement.

Regardless of the specific manner in which it is made, if it is determined in the decision point 66 that the temperature of the fluid being pumped through the orifice of the pressure relief valve 45 has exceeded the predetermined threshold, then the method 60 branches to the instruction 67, wherein the controller 51 generates a valve control output signal to one or more valve control circuits 56 that causes the primary pump valve 41 to be moved to its second position (to the right when viewing FIG. 1). The controller 51 also generates a pump/motor control output signal to one or more pump/motor control circuits 57 that causes the primary pump/motor 25 to be operated in a mode wherein it functions as a motor. The first control valve 42 associated with the first pump/motor 34 and the second control valve 43 associated with the second pump/motor 35 may continued to be maintained in their first positions illustrated in FIG. 1. Similarly, the first and second pump/motors 34 and 35 continue to function as pumps to use the rotational energy of the rotating output shaft 27 to generate a flow of pressurized fluid. Lastly, the main drive clutch 26 continues to be disengaged, and one of the low drive clutch 30 and the high drive clutch 36 continues to be engaged.

As a result, the fluid from the first and second pump/motors 34 and 35 is fed through the primary pump valve 41 to the primary pump/motor 25. When this occurs, the fluid from the first and second pump/motors 34 and 35 causes the primary pump/motor 25 to be operated as a motor. In turn, this causes the primary pump/motor 25 to rotatably drive the primary pump drive gear 24, the input gear 23, the input shaft 22, and the engine 11 (which may be turned off, as described above). Because the main drive clutch 26 remains disengaged, the motoring action of the primary pump/motor 25 and other components does not affect the operation of the other components of the power drive unit 21. However, such operation does consume some of the kinetic energy of the moving vehicle. Thus, the vehicle is continued to be decelerated when operated in this manner. During such operation, fluid is not pumped through the pressure relief valve 45 (or at least not in the same relatively high rate as described above). Consequently, the temperature of such fluid will begin to decrease to a normal operating magnitude.

During this operation, some of the fluid that is stored in the accumulator 40 is also fed through the primary pump valve 41 to the primary pump/motor 25. Consequently, the pressure of the fluid contained within the accumulator 40 will decrease during this operation. When the pressure of the fluid contained within the accumulator 40 becomes less than or equal to a predetermined threshold amount (which is typically somewhat less than the relief valve opening pressure), it can be assumed that the temperature of the fluid in the hybrid drive system 20 has cooled back down to a level where it would be safe to return to the initial extended braking mode of operation, wherein the fluid that is pumped from the first and second pump/motors 34 and 35 is passed through the pressure relief valve 45 to the reservoir 44. To accomplish this, the control apparatus 50 generates one or more valve control signals to the valve control circuits 57, which causes the primary pump valve 41 to return to its first position (shown in FIG. 1).

Thus, it can be seen that the extended braking mode of operation of the hybrid drive system 20 is accomplished in two different manners. In the first manner, fluid is pumped from the first and second pump/motors 34 and 35 through the pressure relief valve 45 to the reservoir 44, and the restriction of such flow provided by the orifice within the pressure relief valve consumes the kinetic energy of the vehicle, causing deceleration of the vehicle. In the second manner, fluid is pumped from the first and second pump/motors 34 and 35 through the primary pump/motor 25 to the reservoir 44, and the mechanical driving of the engine 11 consumes the kinetic energy of the vehicle, causing deceleration of the vehicle. These two different manners of operation are alternated so as to insure that the temperature of the fluid in the hybrid drive system 20 does not exceed a safe magnitude.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A system comprising:
    a hybrid drive system; and
    a control apparatus that operates the hybrid drive system in a normal energy recovery mode in response to a braking request and in an extended braking mode in response to an extended braking request; wherein
    deceleration of the hybrid drive system is accomplished in both the normal energy recovery mode and in the extended braking mode without the use of foundation brakes;
    when the hybrid drive system is operated in the normal energy recovery mode, fluid is pumped to an accumulator to consume kinetic energy; and
    when the hybrid drive system is operated in extended braking mode, fluid is pumped through either (1) a pressure relief valve containing a restriction or (2) a pump/motor operating in a motoring mode to consume kinetic energy.

2. The system defined in claim 1 wherein when the hybrid drive system is operated in the extended braking mode, fluid is alternately pumped through either (1) a pressure relief valve containing a restriction to consume kinetic energy, or (2) a pump/motor operating in a motoring mode to consume kinetic energy.

3. The system defined in claim 2 wherein the fluid is pumped through the pressure relief valve when the temperature of the fluid is below a predetermined level, and wherein the fluid is pumped through the pump/motor when the temperature of the fluid is above the predetermined level.

4. A drive train assembly comprising:
    an input shaft adapted to be connected to a source of rotational power;
    an output shaft adapted to be connected to a rotatably driven mechanism; and
    a hybrid drive system connected to the input shaft and the output shaft, the hybrid drive system including a control apparatus that operates the hybrid drive system in a normal energy recovery mode in response to a braking request and in an extended braking mode in response to an extended braking request; wherein
    deceleration of the output shaft is accomplished in both the normal energy recovery mode and in the extended braking mode without the use of foundation brakes;
    when the hybrid drive system is operated in the normal energy recovery mode, fluid is pumped to an accumulator to consume kinetic energy; and
    when the hybrid drive system is operated in the extended braking mode, fluid is pumped through either (1) a pressure relief valve containing a restriction or (2) a pump/motor operating in a motoring mode to consume kinetic energy.

5. The drive train assembly defined in claim 4 wherein when the hybrid drive system is operated in the extended braking mode, fluid is alternately pumped through either (1) a pressure relief valve containing a restriction to consume kinetic energy, or (2) a pump/motor operating in a motoring mode to consume kinetic energy.

6. The drive train assembly defined in claim 5 wherein the fluid is pumped through the pressure relief valve when the temperature of the fluid is below a predetermined level, and wherein the fluid is pumped through the pump/motor when the temperature of the fluid is above the predetermined level.

7. A method comprising the steps of:
    (a) providing a hybrid drive system and a control apparatus;
    (b) operating the control apparatus to operate the hybrid drive system in a normal energy recovery mode in response to a braking request; and
    (c) operating the control apparatus to operate the hybrid drive system in an extended braking mode in response to an extended braking request; wherein
    deceleration of the hybrid drive system is accomplished in both the normal energy recovery mode and in the extended braking mode without the use of foundation brakes;
    when the hybrid drive system is operated in the normal energy recovery mode, fluid is pumped t an accumulator to consume kinetic energy; and
    when the hybrid drive system is operated in the extended braking mode, fluid is pumped through either (1) a pressure relief valve containing a restriction or (2) a pump/motor operating in a motoring mode to consume kinetic energy.

8. The method defined in claim 7 wherein step (a) is performed by providing the hybrid drive system in a drive train assembly between a source of rotational power and a rotatably driven mechanism.

9. The method defined in claim 7 wherein step (c) is performed by pumping fluid alternately through either (1) a pressure relief valve containing a restriction to consume kinetic energy, or (2) a pump/motor operating in a motoring mode to consume kinetic energy.

10. The method defined in claim 9 wherein step (c) is performed by pumping fluid through the pressure relief valve when the temperature of the fluid is below a predetermined level, and wherein the fluid is pumped through the pump/motor when the temperature of the fluid is above the predetermined level.

11. The method defined in claim 10 wherein the temperature of the fluid is calculated as a function of time being pumped through the pressure relief valve.

* * * * *